(12) United States Patent
Castrec et al.

(10) Patent No.: US 9,269,033 B2
(45) Date of Patent: Feb. 23, 2016

(54) SYSTEM FOR IDENTIFYING JOINTS OF ELEMENTS TO BE ASSEMBLED INTENDED FOR FORMING AN ASSEMBLY SUCH AS, IN PARTICULAR, A PIPELINE OR A TANK, AND IDENTIFICATION METHOD USED IN SUCH A SYSTEM

(75) Inventors: Frederic Castrec, Mitry Mory (FR);
Guillaume Graindor, Paris (FR);
Olivier Higelin, Villemonble (FR)

(73) Assignee: SERIMAX, Mitry Mory (FR)

( * ) Notice: Subject to any disclaimer, the term of this patent is extended or adjusted under 35 U.S.C. 154(b) by 343 days.

(21) Appl. No.: 13/266,952

(22) PCT Filed: Apr. 28, 2010

(86) PCT No.: PCT/EP2010/055728
§ 371 (c)(1),
(2), (4) Date: Dec. 1, 2011

(87) PCT Pub. No.: WO2010/125108
PCT Pub. Date: Nov. 4, 2010

(65) Prior Publication Data
US 2012/0091197 A1    Apr. 19, 2012

(30) Foreign Application Priority Data

Apr. 29, 2009   (FR) .................................... 09 52823

(51) Int. Cl.
*G06F 17/00*        (2006.01)
*G06K 19/06*        (2006.01)
(Continued)

(52) U.S. Cl.
CPC ........... *G06K 19/06009* (2013.01); *F16L 13/02* (2013.01); *G06K 19/07758* (2013.01); *F16L 2201/60* (2013.01)

(58) Field of Classification Search
CPC .. B29C 65/00; B29C 66/8145; B29C 66/861; B29C 66/91921; B29C 66/9672
USPC .......................................................... 235/375
See application file for complete search history.

(56) References Cited

U.S. PATENT DOCUMENTS

| 4,374,451 A | 2/1983 | Miller |
| 5,321,887 A | 6/1994 | Boula |

(Continued)

FOREIGN PATENT DOCUMENTS

| CN | 1547181 A | 11/2004 |
| CN | 1921427 A | 2/2007 |

(Continued)

OTHER PUBLICATIONS

International Search Report Issued Jul. 6, 2010 in PCT/EP10/055728 Filed Apr. 28, 2010.

*Primary Examiner* — Thien M Le
*Assistant Examiner* — Tae Kim
(74) *Attorney, Agent, or Firm* — Oblon, McClelland, Maier & Neustadt, L.L.P.

(57) ABSTRACT

A system for identifying elements involved in joints of elements configured to form a duct, such as a pipeline, which works on element identifiers for an element identification code. The system includes an element identifier reader and a management device for supplying by a combination device the joint identification codes between two elements according to element identification codes of the two elements. The system is also useful for production of tanks for hydrocarbon by-products and for control and maintenance, for example, of pipeline networks and tanks.

13 Claims, 2 Drawing Sheets

(51) Int. Cl.
  *G06K 19/077* (2006.01)
  *F16L 13/02* (2006.01)

(56) References Cited

U.S. PATENT DOCUMENTS

| | | |
|---|---|---|
| 5,620,625 A | 4/1997 | Sauron et al. |
| 2006/0087448 A1 | 4/2006 | Den Boer et al. |

FOREIGN PATENT DOCUMENTS

| | | |
|---|---|---|
| EP | 1 262 272 | 12/2002 |
| FR | 2910975 A1 * | 7/2008 |
| GB | 2 208 310 | 3/1989 |
| GB | 2 377 584 | 1/2003 |
| JP | 2005141337 A | 6/2005 |
| WO | 2004 010163 | 1/2004 |

* cited by examiner

SYSTEM FOR IDENTIFYING JOINTS OF ELEMENTS TO BE ASSEMBLED INTENDED FOR FORMING AN ASSEMBLY SUCH AS, IN PARTICULAR, A PIPELINE OR A TANK, AND IDENTIFICATION METHOD USED IN SUCH A SYSTEM

The present invention relates to a system for identifying joins of elements to be connected together, intended for forming an assembly such as, in particular, a pipeline or a tank for a hydrocarbon-based compound.

The invention also relates to an identification method used in such a system.

The invention has significant applications, in particular in the field of construction and monitoring of pipelines conveying fluids such as gas, oil, water etc. These pipelines are constituted by tubes connected together using welding, which is still a complex operation that must be carried out with care. The major problem is therefore to ensure the quality of the joins between the tubes. On the one hand, good quality welds must be produced on site by qualified personnel, and on the other hand, during subsequent inspections, each of these welded joins must be identified, and therefore must be provided with reliable identification. In order to resolve this quality problem, identification of the joins is vital.

Patent document CN192147 describes a system that detects the weld quality and then transmits the quality information via a data transmission network. However this document does not give any satisfactory description of means for identifying the position where the weld was carried out.

Another significant application of the present invention relates to the fabrication of tanks for hydrocarbon-based compounds based on plates connected together.

In order to obtain good quality welds, the invention proposes a system of the type mentioned in the introduction which provides simple and unambiguous identification of the welded joins in order to facilitate the operations of manufacture, inspection and maintenance of a pipeline network or any other assembly such as a tank and also, beams connected together.

According to the invention, the above-mentioned system is remarkable in that it is equipped with an element identifier reader and a management device for supplying the identification codes of joins between joined elements, by means of a combination device, from the identification codes of the joined elements.

According to the invention, the identification method used in such a system is remarkable in that it comprises the following steps:
  entering identification codes of the elements involved in a join between them,
  combining said element identification codes,
  supplying the join code from the combined code.

A better understanding of how the invention can be implemented will be gained from the following description which together with the attached drawings gives a non-limitative example thereof.

Figure 1:
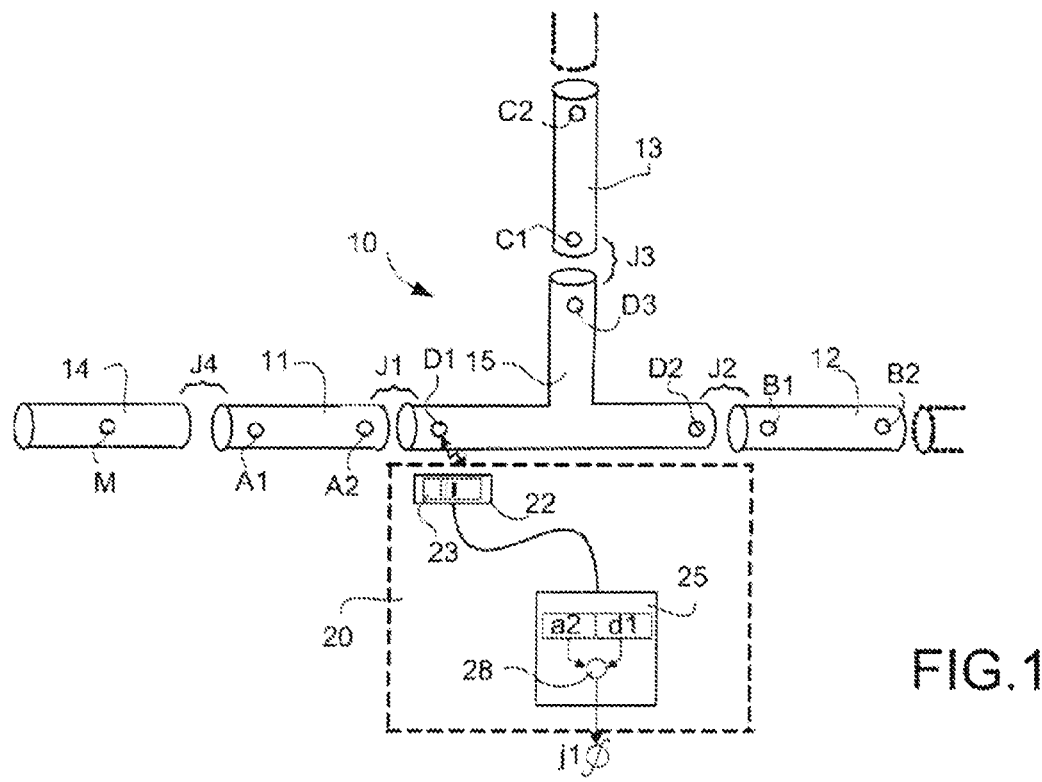
FIG. 1 shows a system according to the invention applied to the joining of tubes constituting a pipeline.

In FIG. 1, the reference 10 represents a partial view of a pipeline network constituted by a set of elements which in this embodiment are tubes, connected together by means of welds. The set of tubes shown in this figure comprises tubes 11, 12, 13 and 14. Moreover, a branch 15, formed of tube elements firmly connected together, connects tubes 11, 12 and 13 to each other. This branch 15 is considered herein as a tube having several ends. Branches are produced by moulding in particular, and in practice are not subject to leakage between the tubes constituting the branch.

In FIG. 1, for reasons of clarity, the different joins between these tubes and the branch 15 are shown in an exploded view. Join J1 connects a first end of tube 11 to a first end of the branch 15, join J2 connects a first end of tube 12 to a second end of the branch 15 and join J3 a first end of tube 13 to a third end of the branch 15. Another join J4 connects the second end of tube 11 to a first end of tube 14.

During their manufacture, these tubes are provided with identifiers. These identifiers can either be single or multiple, it being possible to place one identifier at each tube end. This identifier is called a bevel identifier.

Thus tube 11 is provided with identifiers A1 and A2 at each of its ends, tube 12 is provided with identifiers B1, B2 and tube 13 with identifiers C1, C2. The branch 15 is provided with identifiers D1, D2 and D3. As for tube 14, it comprises a single identifier M placed for example at the centre. Each of the identifiers mentioned bears an identification code referenced by the same letters as the identifiers but in lower case. The codes a1, a2, b1, b2 c1, c2, d1, d2, d3 and m are associated respectively with the different identifiers referenced A1, A2, B1, B2, C1, C2, D1, D2, D3 and M.

It is therefore proposed to identify the different joins J1, J2 and J3 between these tubes and the branch 15 and also the join J4 between tubes 11 and 14. To this end, a join identification system 20 is provided based on an identifier reader 22 for reading the codes contained in the different identifiers A1, A2, B1, B2, C1, C2, C3 and M. A management device 25 is also provided to supply an identification code of the join between two tubes based on the tube identification codes of said two tubes. This is carried out by a combination device 28. The join identification code is made available to the terminal 29.

FIG. 1 shows the example of the identification of join J1. The identifier reader 22 comprises a read head 31 for reading barcodes. It reads the code of the identifiers, presented therefore in the form of barcodes. After reading barcodes a2 and d1 of the identifiers of tube 11 and of the first end of the branch 15 situated on either side of join J1, the combination device 28 determines the code identifying this join J1. This combination device can operate by concatenation of the two codes or carry out another juxtaposition operation such as the differentiation of these codes to obtain another code by sampling characteristic parts of the codes.

As already mentioned, tube 14 comprises a single tube identifier M placed in the middle, for example, of tube 14 intended to be aligned with tube 11 to thus form join J4. The code of this join will therefore be formulated by a combination of codes m and a1.

Of course, it is also possible to write down these codes by hand and to manually identify the code defining the join.

These identifiers can also be presented in the form of RFID tags, i.e. Radio Frequency Identification tags.

Figure 2:
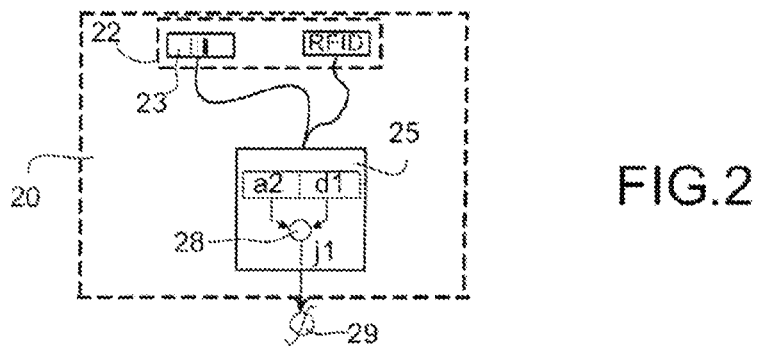
FIG. 2 shows a system according to the invention capable of reading a plurality of types of identifiers.

Tubes bearing identifiers of the barcode or RFID type may be used. To this end, the system comprises an identifier reader comprising the barcode read head 22 and an RFID tag read head 32, as shown in FIG. 2. The user must therefore choose the read head to be used according to the type of identifier.

The invention therefore covers applications concerning these two types of identifiers in combination or separately and also covers any other type of identifiers considered separately or in combination.

Figure 3:
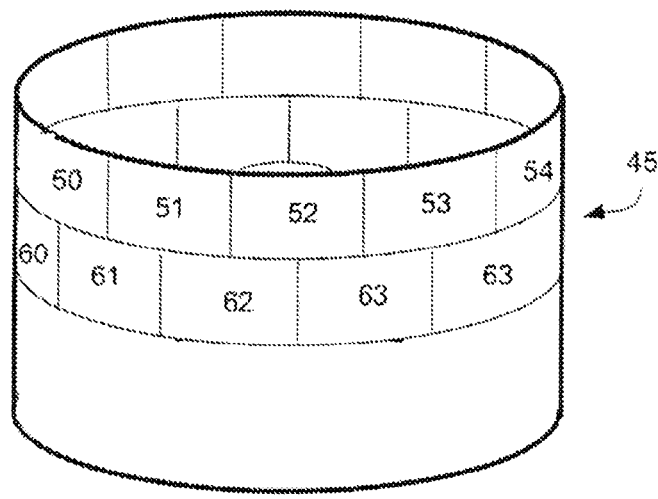
FIG. 3 shows a system according to the invention applied to the joining of plates constituting a tank.
Figure 4:
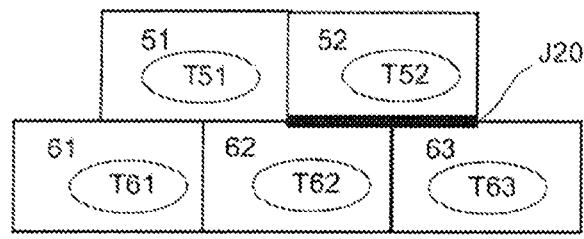
FIG. 4 shows in greater detail the join between the plates of the tank in FIG. 3 for plates having a single identification code.
Figure 5:
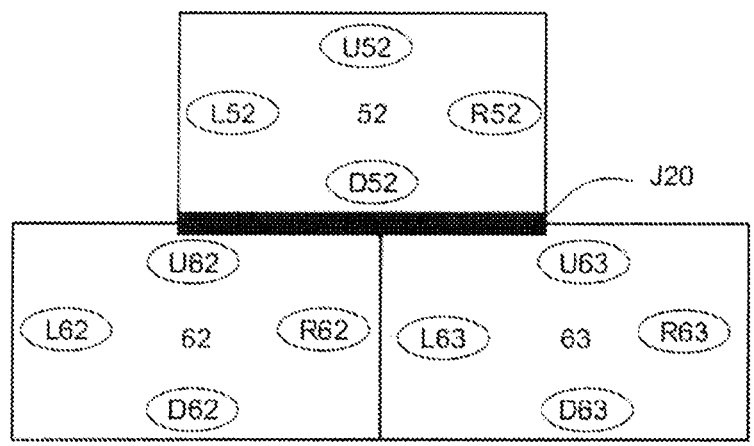
FIG. 5 shows the plates of the tank in FIG. 3 for plates having lateral identification codes.

FIG. 3 shows another application of the invention relating to the fabrication of a tank for hydrocarbons for example. The tank 45 is constituted by a plurality of plates . . . 50, 51, 52, . . . 60, 61, 62, 63, . . . . These plates are therefore connected together to form the tank. They are arranged overlapping, one above the other. Thus, as shown in FIGS. 4 and 5, plate 51 rests both on plate 61 and on plate 62. Plate 52, which abuts plate 51, rests on plates 62 and 63. The plates are welded together in this way. For the purposes of identification it is therefore necessary to combine the identification of the plates involved in a weld. Thus the weld J20 connecting plate 52 to plates 61 and 63 is labelled using the identifiers of the plates.

If plates 52, 61, 62 have a single identifier, the join is identified by the respective codes t52, t61, t62 contained in the identifiers T52, T61, T62. The join J20 can be identified by concatenation of these codes i.e. by "t52 t61 t62".

As shown in FIG. 5, it is also possible for the plates to be provided with identifiers, each placed on their side in order to supply a lateral code. The codes can be l51, u51, r51 and d51 respectively for identifiers L51, U51, R51 and D51 placed on plate 51, l62, u62, r62 and d62 on plate 62 and l63, u63, r63 and r63 on plate 63. The code identifying join J20 then becomes: "u62 d52 u63".

Of course, the invention applies in the event of plates having lateral codes and single codes for the production of a single tank.

Figure 6:
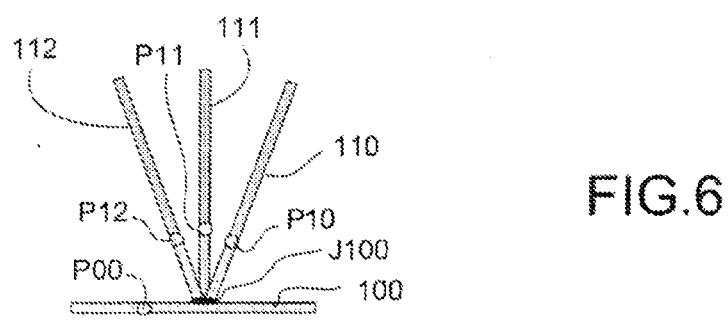
FIG. 6 shows a system according to the invention applied to the joining of beams.

A further example of application is that of joining beams or other sections, as shown in FIG. 6. In FIG. 6 several beam elements 100, 110, 111 and 112 are connected together by a welded join J100. Again, for identifying this join J100, the identification codes p00, p10, p11, p12 are used, contained in identifiers P00, P10, P11, P12 that can be borne respectively by the different beams 100, 110, 111 and 112. The identification code of the join is in the form "p00, p10, p11, p12".

The invention claimed is:

1. A system for identifying joints of elements to be connected together configured to form an assembly, or a pipeline or a tank, for which each element includes at least one element identifier for an element identification code, the system comprising:
   an element identifier reader; and
   a management device to generate by a combination device an identification code for a joint between the joined elements based on identification codes of the joined elements, the identification code for the joint being a third code distinct from the identification codes of the joined elements, wherein
   the at least one element identifier includes at least one identifier constituted by a tag of an RFID type, and the identifier reader comprises an RFID tag code read head.

2. An identification system according to claim 1, wherein the combination device operates by concatenation of the identification codes of the elements involved in the joint to form the identification code of the joint.

3. An identification system according to claim 1, for which at least one of the elements comprises a single tube identifier used to form the identification code of the joint.

4. An identification system according to claim 1, for which at least one of the elements comprises tube end identifiers for an element end identification code placed at each of ends of the elements to form the identification code of the joint based on element or end identification codes situated on either side of the joint.

5. An identification system according to claim 1, for which the at least one element identifier includes at least one identifier identifiers are constituted by a legend of a barcode type, wherein the identifier reader comprises a barcode read head and the RFID tag code read head.

6. An identification system according to claim 1, for which the at least one element identifier includes some identifiers constituted by legends of barcode type and others by tags of RFID type, wherein the identifier reader comprises a barcode read head and the RFID tag code read head.

7. An identification system according to claim 1, wherein the elements are tubes for pipelines.

8. An identification system according to claim 1, wherein the elements are plates for constructing a tank.

9. An identification system according to claim 1, wherein the elements are of beam type.

10. An identification system according to claim 1, wherein said joint identification code identifies said elements to be connected together to form said joint identified by said joint identification code.

11. An identification system according to claim 1, wherein the management device generates by the combination device the identification code for the joint by sampling characteristic parts of the identification codes of the joined elements.

12. A system for identifying joints of elements to be connected together, wherein each element includes at least one element identification code, the system comprising:
   a reader configured to read said element identification code on elements to be connected together; and
   a combination device configured to combine, for a joint between elements to be connected together, at least two element identification codes read by said reader from said elements to be connected together, said combination device generating, for said joint, a joint identification code based on a combination of the identification codes of the elements to be connected together such that said joint identification code uniquely identifies said joint, wherein
   the at least one element identification code includes at least one identifier constituted by a tag of an RFID type, and the reader comprises an RFID tag code read head.

13. A joint identification system for a pipeline or a tank comprising:
   at least two identifiers respectively provided on two pipeline or tank elements to be connected together by a joint, each identifier being associated with a unique identification code for a respective element;
   a reader configured to read the identification codes of the identifiers;
   a combination device configured to generate a unique code by combining at least two identification codes read by said reader;
   a terminal configured to make available the code generated by the combination device as a unique identification code for the joint between the elements to be connected together, wherein
   the at least two identifiers include at least one identifier constituted by a tag of an RFID type, and the reader comprises an RFID tag code read head.

* * * * *